Feb. 14, 1933.  T. R. HERBEST, JR  1,897,803
METHOD OF AND APPARATUS FOR MANUFACTURING LATH
Filed April 14, 1930  4 Sheets-Sheet 1

INVENTOR
Thomas R. Herbest Jr
BY
Symestvedt & Lechner
ATTORNEYS

Feb. 14, 1933.  T. R. HERBEST, JR  1,897,803
METHOD OF AND APPARATUS FOR MANUFACTURING LATH
Filed April 14, 1930  4 Sheets-Sheet 2
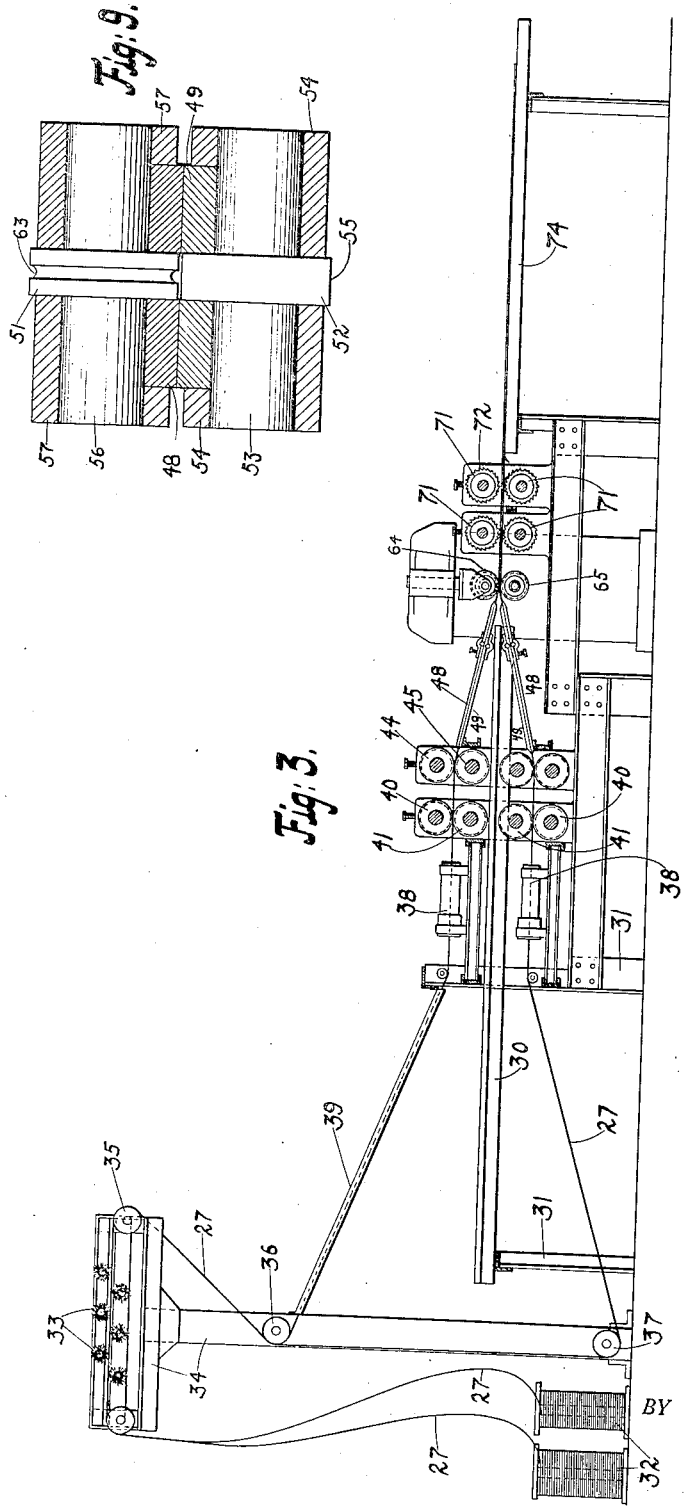
INVENTOR.
Thomas R. Herbest Jr.
BY Synnestvedt + Lechner
ATTORNEYS.

Feb. 14, 1933.  T. R. HERBEST, JR  1,897,803
METHOD OF AND APPARATUS FOR MANUFACTURING LATH
Filed April 14, 1930  4 Sheets-Sheet 3
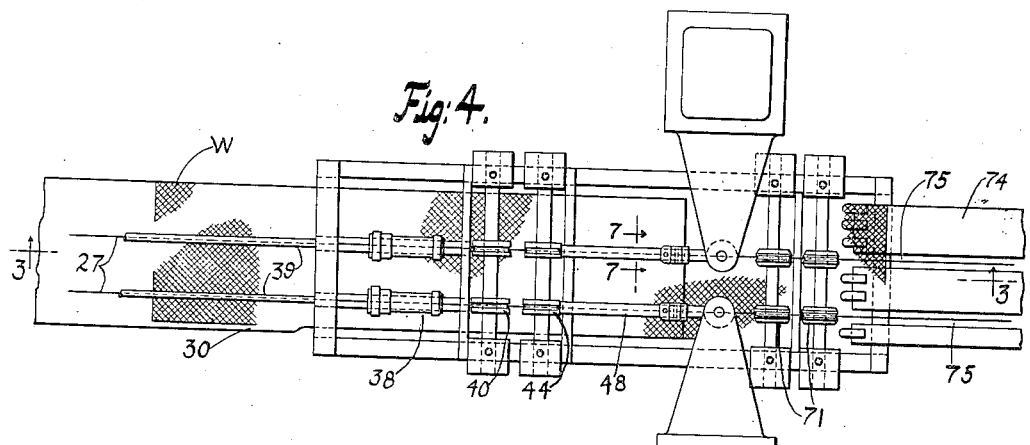
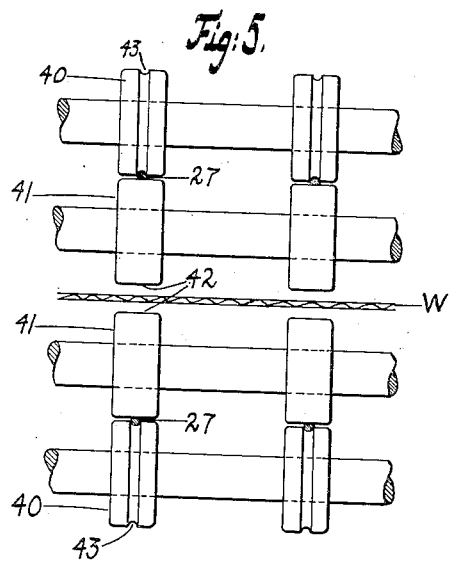
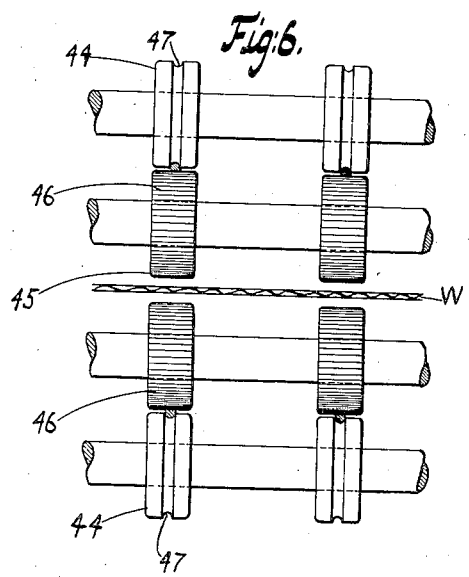
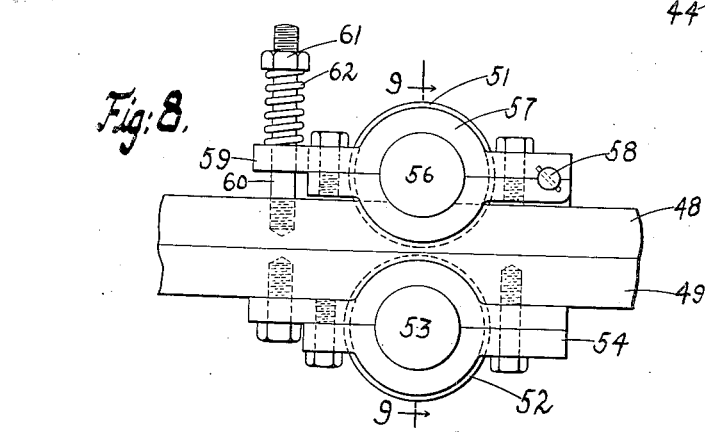
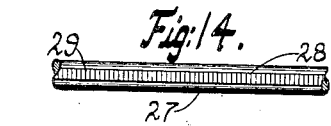
INVENTOR.
Thomas R. Herbest Jr.
BY
Symmestvedt + Lechner
ATTORNEYS.

Feb. 14, 1933. T. R. HERBEST, JR 1,897,803
METHOD OF AND APPARATUS FOR MANUFACTURING LATH
Filed April 14, 1930 4 Sheets-Sheet 4
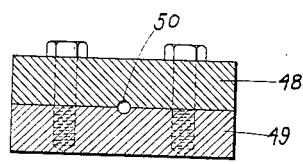
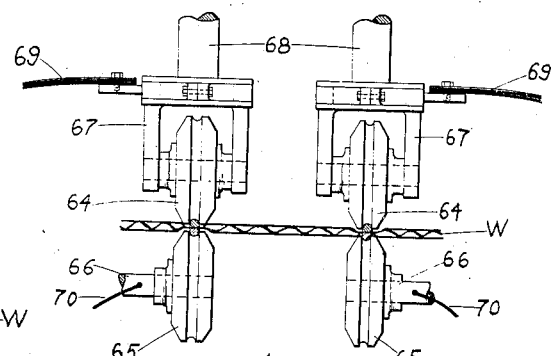
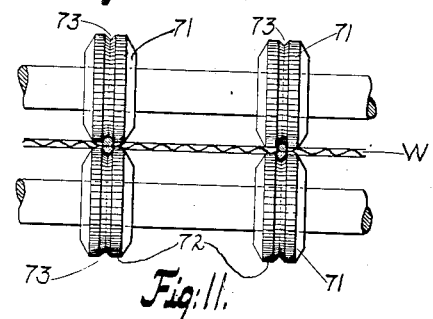
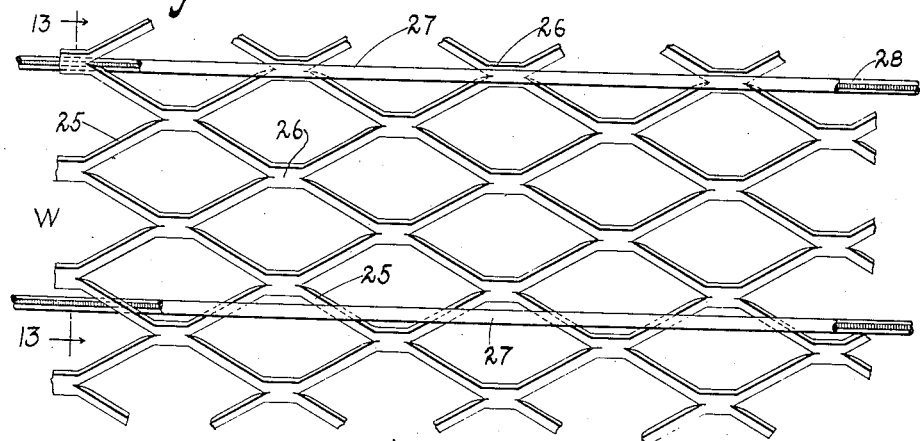
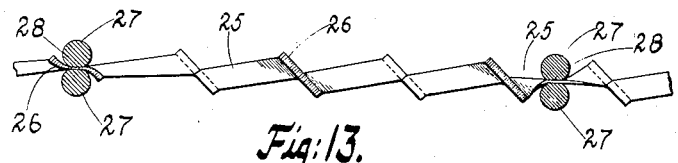
INVENTOR.
Thomas R. Herbest Jr.
BY
Symmestredt & Lechner
ATTORNEYS.

Patented Feb. 14, 1933

1,897,803

UNITED STATES PATENT OFFICE

THOMAS R. HERBEST, JR., OF WHEELING, WEST VIRGINIA, ASSIGNOR TO THE CONSOLIDATED EXPANDED METAL COMPANIES, OF WHEELING, WEST VIRGINIA, A CORPORATION OF WEST VIRGINIA

METHOD OF AND APPARATUS FOR MANUFACTURING LATH

Application filed April 14, 1930. Serial No. 444,173.

This invention relates to a method of and apparatus for manufacturing lath and is particularly concerned with the type of lath which includes strengthening ribs or members provided to increase the rigidity of the sheets.

The present application is in part a continuation of my co-pending application, Serial No. 197,860, filed June 10, 1927.

In general, the present invention has in view an improved method of making ribbed or reenforced fabric or lath.

In addition, it is an object of this invention to provide an improved apparatus for carrying out the method.

More specifically, the present invention contemplates the production of lath of any given strength or rigidity from finer gauge material than that used heretofore, or, conversely, the production of lath of greater strength from any given gauge material.

The present invention further provides a method of and apparatus for manufacturing the lath referred to without causing distortion, rupture or disfiguring of the mesh-work in any manner. To accomplish these ends the present invention contemplates application of reenforcing members to metallic mesh-work by arranging such members at opposite faces of the lath, and welding the same to each other with the mesh-work interposed therebetween.

In the preferred arrangement the reenforcing members or ribs take the form of pairs of wires which are arranged on opposite faces of the sheets, the wires of each pair extending parallel to each other and being welded to each other preferably only at spaced points throughout their length after the manner of spot welding. This structure is very advantageous in view of its great rigidity and tensile strength, which are the result of the provision of a strengthening member, which, in effect, extends through the sheet and projects outwardly at each face thereof.

As a precautionary measure the wires are preferably flattened at the surfaces thereof which are welded together, with the result that any tendency to weaken or cut the fabric under the pressure applied in the welding operation is eliminated. This permits greater speed of production without impairing the strength of the lath.

Still further with a view to facilitating the welding operation, the juxtaposed and flattened surfaces of the reenforcing wires are roughened or knurled to provide a multiplicity of relatively small points of contact between the wires.

It is also worthy of note that my invention has in view the provision of a method and apparatus for producing lath of the type above referred to which is capable of continuous as well as high speed operation.

Finally, the present invention includes means for compensating for shrinkage or contraction of the wires when they cool after the welding operation, thus preventing any "bowing" or distortion of the sheets which might occur as a result of the contraction.

How the foregoing objects and advantages, as well as others, which will occur to those skilled in the art, are obtained, will be clear from consideration of the following description taken with the accompanying drawings which illustrate several embodiments of the apparatus.

In the drawings:—

Figure 3 is a vertical sectional view of the preferred embodiment of the apparatus, taken substantially as indicated by the section line 3—3 on Fig. 4, certain of the parts being broken away or shown in elevation for the sake of clarity;

Figure 4 is a fragmentary plan view of the embodiment illustrated in Fig. 3;

Figures 1, 2:
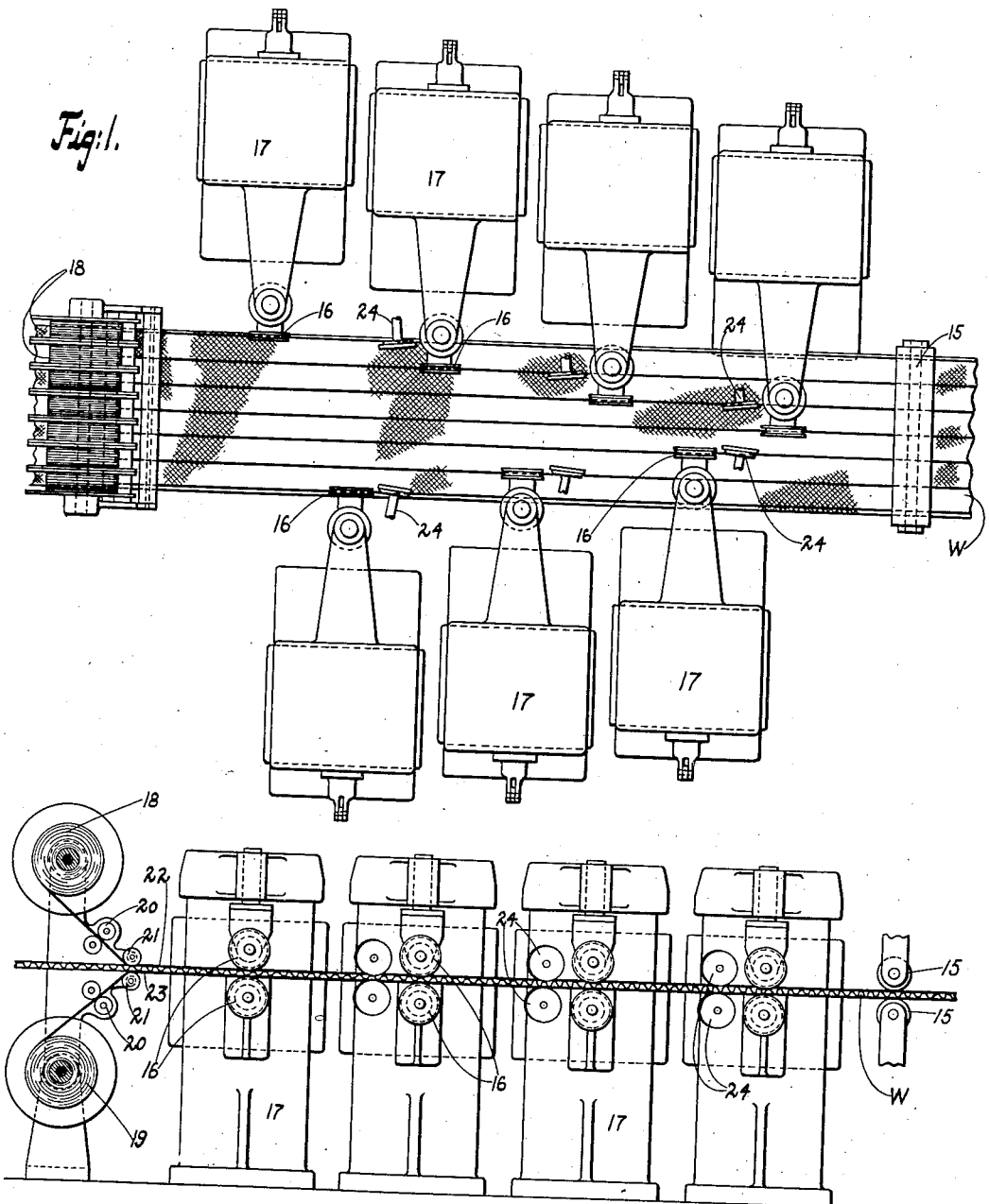
Figure 1 is a somewhat diagrammatic plan view of one form of the apparatus.
Figure 2 is a side elevational view of the mechanism illustrated in Fig. 1.

Figures 5 to 11 inclusive are views illustrating certain details of the apparatus, Fig. 7 being taken substantially as indicated by the section line 7—7 of Fig. 4, and Figure 9 being taken as indicated by the section line 9—9 of Fig. 8;

Figure 12 is a fragmentary plan view of the lath produced according to the present invention;

Figure 13 is a sectional view of the lath of Fig. 12, taken substantially as indicated by the line 13—13 of Fig. 12; and Figure 14 is a view illustrating in detail the configuration of one of the reenforcing wires.

Referring first to Figures 1 and 2, the reference character 15 indicates cooperating feed rolls which aid in drawing the reticulated metal, diagrammatically indicated at "W", through the welding apparatus, while the reference numeral 16 indicates a plurality of rotating welding heads or electrodes which are arranged in pairs to receive the metal mesh-work therebetween, the electrodes being supported by the welding machines 17. At the feeding end of the apparatus (at the left in Figs. 1 and 2) I have arranged upper and lower sets of wire reels 18 and 19, respectively, which are arranged to feed suitable reinforcing wire through the guide rollers 20 and 21 to the upper and lower faces of the lath as indicated at 22 and 23, respectively. The wires, furthermore, are fed in such manner that they are arranged in pairs extending parallel to each other and longitudinally of the lath sheets. In this connection it should also be observed that the revolving electrodes 16 are arranged in staggered relation to each other longitudinally of the sheet and that a pair of electrodes is provided to accomplish the welding together of each pair of strengthening wires so that, in the application of seven strengthening ribs to a sheet of lath, as illustrated in Fig. 1, the first set of electrodes, beginning at the feeding end of the apparatus, welds the pair of wires at one edge of the sheet and the next set of electrodes, progressing toward the delivery end of the apparatus, welds the pair of wires at the opposite edge of the sheet. In like manner the third set of electrodes welds the next pair of wires toward the centre of the sheet while the fourth set welds the corresponding pair at the opposite side of the sheet, and so forth progressively, to the last set of electrodes which take care of the centre strengthening members.

The electrodes 16, it should also be noted, are suitably grooved in order to engage and maintain the wires of each pair in their parallel relationship during the welding operation.

Furthermore, in this form of the invention the means for compensating for the contraction of the wires after the welding operation has been performed and the wires cool, take the form of pairs of rollers 24, the pairs being arranged in sets and being mounted to revolve on axes somewhat angled with respect to a line drawn transversely across the sheet (see Fig. 1). These sets of rollers stretch or widen the metal fabric and thus alter the configuration of the mesh-work openings to compensate for longitudinal contraction in the sheet when the wires cool.

By referring now to Figures 12 and 13 it will be seen that the lath "W" includes meshwork comprising connecting strands 25 and bridges 26, the particular form illustrated being of the so-called "diamond" type. The sheets of lath are, of course, slitted and expanded in any desired manner, in which connection it should be observed that the present invention is not limited in its application to the particular form or type of lath illustrated in these figures but, on the other hand, contemplates applying strengthening members of the particular type herein disclosed to any form of reticulated metal or mesh-work. The strengthening members or wire are indicated in Figs. 12 and 13 by the reference numeral 27 and, as already noted, these wires are arranged in pairs, the wires of each pair extending longitudinally of the sheets and parallel to each other. It is also to be noted that the wires need not be applied to the lath at any particular points transversely thereof but, as indicated in Figs. 12 and 13, may fall either on the bridges 26 or on the connecting strands 25, of the mesh-work.

Lath having the features described just above may be produced by the method and apparatus disclosed in Figs. 1 and 2 but in the preferred form the strengthening wires are somewhat flattened on their adjacent surfaces as indicated at 28 in Figs. 12, 13 and 14. This flattening is provided in order to eliminate or minimize any tendency to shear the strands or bridges of the mesh-work during the welding operation, the flattened surfaces providing greater contact areas to receive the relatively great pressure which is preferably applied during the welding operation. In addition, the flattened surfaces are preferably knurled or roughened as at 29 (see Figure 14). The roughened or knurled surfaces are advantageous in providing, as noted above, a multiplicity of points of contact with the result that the welding operation is more effective in uniting the wires of each pair.

Apparatus for producing the lath above described in its preferred form is illustrated in Figs. 3 to 11 inclusive. In Figs. 3 and 4 a work table or support is indicated at 30, the same being supported on suitable standards 31 and serving as a feed table from which the sheets of mesh-work are delivered to the welding apparatus. In this form of the apparatus the strengthening wires 27 are preferably fed from reels or spools 32, which may be located at any suitable point such, for example, as illustrated in Fig. 3, that is, at the outer end of the feed table 30. In order to ensure the best possible welding conditions the wires 27 are preferably fed through any suitable cleaning apparatus such as the wire brushes indicated at 33 in Fig. 3, the said brushes being suitably supported or arranged on supporting structure 34. After leaving the cleaners 33, the wires 27 are fed over suitable guide rollers 35, 36 and 37 to wire straighteners of any desired type, as indicated at 38. At this point it should be noted that the apparatus, Figs. 3 and 4, is arranged to apply only two pairs of wires to the metal fabric but it is to be understood that any desired number of pairs may be applied merely by altering the number of feeding spools, cleaners, and other parts of the apparatus to be described herebelow.

However, in the form illustrated in Figs. 3 and 4, the upper and lower wires 27 of each pair are fed by means of the rollers 36 and 37 respectively, to the welding apparatus from points located above and below the work table 30. If desired, in order to protect the wires while they are being fed from the rollers 36 and 37 to the wire straighteners, tubes or guides, such as indicated at 39, may be provided.

After the wires leave the straighteners 38 they are engaged between cooperating pairs of rollers 40 and 41, a pair being provided for each wire as most clearly illustrated in Fig. 5. From this figure it will also be seen that the rollers 41, that is, the lower rollers of the upper pairs and the upper rollers of the lower pairs, are provided with plain or flat working pairs, are provided with plain or flat working surfaces 42, while the other rollers 40 of each pair are grooved as indicated at 43. The pairs of rollers 40 and 41 are pressed or forced toward each other with sufficient force to flatten the surfaces of the wires which are ultimately welded together.

After leaving the rollers just described the wires 27 are engaged by additional pairs of cooperating rollers 44 and 45, the latter of which are provided with small teeth or roughened surfaces 46 for engaging and knurling the previously flattened surfaces of the wires. The other rollers of these pairs are grooved as at 47, in the same manner as the rollers 40, in order to properly feed the wires.

Upon discharge of the wires from the knurling rollers they enter the fixed or stationary pairs of guide members 48 and 49 (see Figs. 3, 7 and 8). As illustrated in Fig. 7, the guides 48 and 49 have grooves 50 therein which are adapted to keep the wires straight or unbent as they are fed into the welding heads or electrodes. The upper and lower cooperating guides 48 and 49, furthermore, converge toward their delivery ends at which point the wires of each pair pass between the welding rollers or electrodes.

In order to prevent the wires from turning or rotating during their travel from the flattening and knurling rolls and through the guides 48 and 49, I have interposed in the guides, pairs of rollers 51 and 52 (see Figs. 8 and 9). The rollers 52 of each pair are mounted on shafts 53, the latter being suitably secured to the guide members 49 by means of bushings 54. These rollers (52) furthermore, are provided with flat working surfaces 55, which are adapted to engage the flattened surfaces 28 of the wires 27. The other rollers (51) of these pairs are mounted on shafts 56 suitably journaled in bearings 57. Instead of being rigidly mounted on the guides these bearings or bushings 57 are pivotally mounted at one end on pins 58, the latter being supported on the guide members 48. At their other ends the bushings 57 are provided with apertured extensions 59 adapted to receive bolts 60 which are tapped in the guide members 48, all as illustrated in Fig. 8. The outer ends of each one of the bolts 60 are threaded to receive adjusting nuts 61 between which and the extensions 59, springs 62 react. The rollers 51 are provided with grooved working surfaces 63 and, by means of the pivot and spring structure just described, are pressed toward the cooperating rollers 52 with sufficient pressure to maintain the flattened surfaces 28 of the wires in proper position for welding.

Proceeding now to the welding apparatus proper, it will be seen (see Figs. 3 and 10) that the welding electrodes take the form of grooved rollers 64 and 65, which are preferably constructed of copper or some other metal suitable for making electric contact. The lower welding rollers 65 are preferably rigidly mounted on shafts 66 which are journaled in such manner as to prevent vertical movement thereof. In order to provide suitable pressure between the pairs of welding electrodes the upper rollers 64, are individually mounted to revolve in brackets 67 which may be forced downwardly in any suitable manner such as by air pressure applied above the upwardly extending shafts 68.

The welding current may be supplied to the electrodes by means of conductors 69 and 70, the latter being diagrammatically indicated in Fig. 10. In connection with the welding operation proper, it is to be observed that spot welding, that is, welding at spaced points along the wires only, is preferable. This type of welding may be accomplished satisfactorily by employing suitable current interrupting means operating at the desired rate of speed or, if desired, the intermittent welding may be accomplished by employing welding electrodes or rollers having alternately arranged segments of electric current conducting and insulating material. On the other hand, under certain circumstances or when certain special types of lath or reenforcement are being produced it may be found to be desirable to perform a continuous welding operation through the entire length of the strengthening members.

At this point it should be observed that the feed of the sheets of meshwork is accomplished by placing the sheets on the work table 30 and moving the same preferably lengthwise to and between the welding heads, it being noted that at this point the strengthening wires 27 converge and contact with opposite faces of the strands 25 and bridges 26 of the lath. The lath thus is gripped and fed between the wires by virtue of the pressure exerted on the upper electrodes 64. From this point on, therefore, the feed of the lath is automatic and does not require any additional handling.

At the delivery side of the welding electrodes are arranged two sets of cooperating pairs of feeding rollers 71, the working surfaces of all of which are toothed, as indicated at 72, after the manner of a circular saw. In addition the working surface of each one of the rollers 71 is provided with a groove extending circumferentially through the toothed surface 72 and preferably V-shaped, as indicated at 73 in Fig. 11. These rollers 71 are toothed and grooved in the manner indicated in order to ensure positive engagement of the wires 27 and thus provide accurate and positive feed or drawing action. It is to be understood that all of the rollers 40, 41, 44, 45 and 71 are mounted on suitable supporting shafts, which are journaled in any desired manner, at the sides of the apparatus. The rollers just referred to, furthermore, are all preferably driven by any suitable driving mechanism (not shown) while the welding rollers or electrodes are preferably mounted for free rotation under the influence of the lath and the wires being drawn therethrough.

For the sake of convenience in handling the sheets a second working table or support 74 is arranged at the delivery side of the pairs of drawing rollers 71 in a position to receive the sheets as they are discharged from the apparatus. The working table, furthermore, is provided with grooves or recesses 75 on its upper face extending longitudinally throughout the length of the table and transversely spaced in such manner that each of the ribs welded to the fabric overlies a groove 75, the purpose of this arrangement being explained more fully herebelow.

In operation the wires which ultimately form the ribs of the lath are first started through the various pairs of cooperating rollers and guides and upon operation of the apparatus these wires are welded to each other as they progress through the machine. As soon as the wires have become started through the apparatus in this manner, sheets of the expanded or reticulated fabric are placed upon the table 30 and moved forward individually, one immediately following another, to be engaged by the welding electrodes and drawn through the remaining portion of the apparatus by means of the rollers 71. As the sheets are delivered from the rollers 71 they may be cut apart or separated by any suitable means adapted to sever the wires extending between the adjacent ends of the sheets. This may be accomplished by means of some suitable shearing device operated in synchronism with the operation of the welding apparatus, or the severing of the sheets may be accomplished by means of a manually operated cutting tool. In order to facilitate separation or cutting according to this method the table is provided with the longitudinally extending grooves 75 above referred to, the same being of dimensions sufficient to accommodate a cutting tool projected thereinto from above the wires.

In order to compensate for the shrinkage of the wires as they cool subsequent to the welding operation, the drawing rollers 71 are driven at a speed slightly greater than the speed at which the flattening and knurling rollers are driven. In this way the section of the wires lying between the knurling and the drawing rollers is placed under tension so that the wires are stretched or elongated a little while they are passing from the welding electrodes to the drawing rollers and before the wires have cooled substantially from the temperature produced by the welding operation. If this, or some other means were not provided for compensating for shrinkage or contraction of the wires upon cooling the mesh-work of the lath would be drawn together lengthwise of the sheet and distorted. The speed at which the drawing rollers are driven is sufficiently greater than the speed at which the wires travel (before they pass between the welding electrodes) to elongate or stretch the wires to such an extent that upon cooling thereof to atmospheric temperatures the shortening effect is completely counteracted. The finished product, therefore, when at atmospheric temperatures, is perfectly flat and not distorted in any manner.

It should also be noted in connection with the welding of the wires of each pair that while occasionally or periodically the points of welding may fall on strands or bridges of the mesh-work, still most of the points of welding fall or occur within the meshes of the fabric. The direct welding together of the wires of each pair, therefore, is the primary bond which is relied upon to secure the entire structure together in a rigid and permanent manner. The points of welding which fall on strands or bridges, of the mesh-work, of course, result in uniting or bonding the lath directly with the wires. In this connection, however, attention is called to the fact that under certain circumstances, particularly where very thin or fine gauge reticulated material is employed, it is not practicable to weld a member such as one of the wires 27 to the fabric itself in view of the fact that such a welding operation would burn out, or at least materially weaken the strands or bridges. This is noted in order to bring out the advantage of welding wire to wire with the mesh-work therebetween in accordance with the present invention, the present method reducing to a minimum any tendency which the welds may have toward weakening or burning out the strands.

Still further, the provision of flat welding surfaces on the wires 27 minimizes the tendency of the pressure employed to sever or cut the strands of the mesh-work in view of the relatively large areas over which the pressure is distributed. In the preferred form, therefore, lath of the type herein disclosed may be manufactured without danger of weakening or cutting the strands of the mesh-work either as a result of burning or as a result of shearing under pressure. From this follows the additional advantage that the apparatus may be operated at a very high rate of speed even when very thin gauge material is being used.

The strength and rigidity of the welded joints between the pairs of strengthening wires is still further enhanced by virtue of the fact that the adjacent flattened surfaces of the wires are knurled or otherwise slightly roughened. With the wires knurled in this manner a very desirable type of welded joint is produced, it being noted that during the welding operation the small metallic projections resulting from the knurling, primarily by virtue of their small cross sectional area, are very readily fused or united to each other. The knurling is still further advantageous in reducing the danger of cutting or shearing the fabric at any points at which a welding joint may fall on a strand or connecting bridge of the mesh-work itself. The reason for this last advantage probably lies in the fact that the welding is more or less distributed throughout a plurality of very small points of contact to each spot-weld.

Also, the present invention makes possible the production of a metal fabric of any given gauge material having greater rigidity and strength throughout the entire sheet than would be possible with the use of any other practicable type of ribbing. As a corollary to this, lath of a given general or mean rigidity may be manufactured from finer gauge stock.

What I claim is:

1. The method of reenforcing metallic fabric which includes continuously feeding a pair of wires past fixed welding means, flattening the adjacent surfaces of the wires, utilizing said means to weld the wires to each other and feeding sheets of the fabric between the wires.

2. The method of reenforcing metallic fabric which includes continuously feeding a pair of wires past fixed welding means, knurling the adjacent surfaces of the wires, utilizing said means to weld the wires to each other, and feeding sheets of the fabric between the wires.

3. The method of reenforcing metallic fabric which includes continuously feeding a pair of wires past fixed welding means, flattening the adjacent surfaces of the wires, knurling the flattened surfaces, utilizing said means to weld the wires to each other and feeding sheets of the fabric between the wires.

4. The method of reenforcing metallic fabric which includes continuously feeding a pair of wires past fixed welding means, serially feeding sheets of the fabric between the wires, utilizing said means to weld the wires to each other with the sheets interposed therebetween and placing the wires under tension during the welding.

5. The method of reenforcing metallic fabric which includes continuously feeding a pair of wires past fixed welding means, feeding sheets of the fabric between the wires, utilizing said means to weld the wires to each other with the sheets interposed therebetween and elongating the wires.

6. The method of reenforcing metallic fabric which includes continuously feeding a pair of wires past fixed welding means, feeding sheets of the fabric between the wires, utilizing said means to weld the wires to each other with the sheets interposed therebetween and elongating the wires while they are hot from the welding operation.

7. The method of reenforcing reticulated metal which includes positioning a pair of elongated strengthening members at opposite faces of the metal, welding the members to each other with the metal interposed therebetween and elongating the members.

8. The method of reenforcing reticulated metal which includes positioning a pair of elongated strengthening members at opposite faces of the metal, welding the members to each other with the metal interposed therebetween and elongating the members while they are hot from the welding operation.

9. Apparatus for manufacturing lath including means for feeding a pair of wires from sources of supply to and through a pair of rotatably mounted welding electrodes adapted to weld the wires of the pair to each other, said welding electrodes, and means for feeding sheets of metallic fabric through the said electrodes between the wires.

10. Apparatus for manufacturing lath including means for feeding a pair of wires from sources of supply to and through a pair of rotatably mounted welding electrodes adapted to weld the wires of the pair to each other, said welding electrodes, and means for feeding sheets of metallic fabric through the said electrodes between the wires, together with means for elongating the wires after they pass through the electrodes.

11. Apparatus for manufacturing lath including means for feeding a pair of wires from sources of supply to and through a pair of rotatably mounted welding electrodes adapted to weld the wires of the pair to each other, said welding electrodes, and means for feeding sheets of metallic fabric through the said electrodes between the wires, together with means for elongating the wires after they pass through the electrodes including a pair of drawing rollers adapted to engage the welded wires.

12. Apparatus for manufacturing lath including means for feeding a pair of wires from sources of supply to and through a pair of rotatably mounted welding electrodes adapted to weld the wires of the pair to each other, said welding electrodes, and means for feeding sheets of metallic fabric through the said electrodes between the wires, together with means for elongating the wires after they pass through the electrodes including a pair of toothed rollers adapted to engage the welded wires.

13. Apparatus for manufacturing lath including means for feeding a pair of wires from sources of supply to and through a pair of rotatably mounted welding electrodes adapted to weld the wires of the pair to each other, said welding electrodes, and means for feeding sheets of metallic fabric through the said electrodes between the wires, together with means for elongating the wires after they pass through the electrodes including a pair of toothed rollers adapted to engage the welded wires and means for driving said rollers at a speed greater than the said feed of the wires.

14. Apparatus for making lath including means for feeding a pair of wires with metallic mesh-work therebetween, means for welding the wires to each other through the mesh-work and means exerting tension on the wires during the welding operation.

15. Apparatus for securing strengthening members to metallic mesh-work including fixed welding means and means for feeding a pair of elongated strengthening members through the welding means with the mesh-work interposed therebetween, together with means for stretching said members.

16. Apparatus for securing strengthening members to metallic mesh-work including fixed welding means and means for feeding a pair of elongated strengthening members through the welding means with the mesh-work interposed therebetween, together with drawing means positioned at the delivery side of the welding means and adapted to engage and stretch the said members.

17. Apparatus for securing strengthening members to metallic mesh-work including fixed welding means, means for feeding a pair of elongated and flattened strengthening members through the welding means with the mesh-work interposed therebetween and guide means for maintaining flattened surfaces of said members adjacent each other during the feeding.

18. Apparatus for securing strengthening members to metallic mesh-work including fixed welding means, means for feeding a pair of elongated and flattened strengthening members through the welding means with the mesh-work interposed therebetween and guide means for maintaining flattened surfaces of said members adjacent each other during the feeding, together with means, positioned in advance of the welding means, for knurling the flattened surfaces.

19. Apparaus for securing strengthening members to metallic mesh-work including fixed welding means, means for feeding a pair of elongated and flattened strengthening members through the welding means with the mesh-work interposed therebetween and guide means for maintaining flattened surfaces of said members adjacent each other during the feeding, together with means, positioned in advance of the welding means, for knurling the flattened surfaces and means for stretching the said members as they are delivered from the welding means.

20. Apparatus for securing strengthening members to metallic mesh-work including fixed welding means, means for feeding a pair of elongated and flattened strengthening members through the welding means with the mesh-work interposed therebetween and guide means including a roller having a flattened surface for maintaining flattened surfaces of said members adjacent each other during the feeding.

21. The herein described method of making ribbed metallic fabric which includes welding the fabric between strengthening members arranged at opposite faces thereof in such a manner that the fabric is rigidly engaged at a plurality of points along said members, and preventing the members, in cooling, from warping the fabric.

22. Apparatus for making lath including means for feeding a pair of wires with metallic mesh-work therebetween, means for welding the wires to each other through the mesh-work at a plurality of points in the mesh-work and means preventing distortion of the mesh-work when the wires cool.

23. The herein described method of making reenforced mesh-work fabric which includes positioning a pair of elongated strengthening members at opposite sides of the mesh-work, welding said members to each other with mesh-work interposed therebetween, the welding being effected in such manner as to provide rigid engagement of portions of the mesh-work between said members at least at a plurality of points, and placing the strengthening members under tension during the welding operation to provide for elongation thereof, whereby, during cooling, after the welding operation, the contraction of the strengthening members does not warp or distort the mesh-work materially.

24. The method of reenforcing metallic mesh-work sheets of substantially the usual or standard dimensions which includes continuously feeding a pair of wires past fixed welding means, serially feeding the sheets of fabric between the wires, utilizing said means to unite the wires with the sheets interposed therebetween and subsequently severing the wires between the adjacent ends of the sheets.

25. The method of manufacturing reenforced lathing which includes feeding a sheet of metallic mesh-work, in a substantially horizontally extended path, simultaneously feeding wires at opposite faces of the sheet, welding the wires to each other with the sheet interposed therebetween, and placing the wires under tension during the welding.

26. An apparatus of the character described, cooperating welding heads, guide means for feeding sheets of metallic fabric between the welding heads, and guide means for feeding strengthening wires to said heads at opposite sides of the sheets from points spaced at opposite sides of the means first mentioned.

In testimony whereof I have hereunto signed my name.

THOS. R. HERBEST, Jr.